United States Patent
Mohammed-Fakir et al.

(10) Patent No.: US 6,609,885 B2
(45) Date of Patent: Aug. 26, 2003

(54) SUPPLEMENTAL SEAL FOR THE CHORDAL HINGE SEAL IN A GAS TURBINE

(75) Inventors: Abdul-Azeez Mohammed-Fakir, Schenectady, NY (US); Mahmut Faruk Aksit, Istanbul (TR); Ahmad Safi, Troy, NY (US); Iain Robertson Kellock, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/028,931

(22) Filed: Dec. 28, 2001

(65) Prior Publication Data

US 2003/0123980 A1 Jul. 3, 2003

(51) Int. Cl.$^7$ .................................. F01D 9/04
(52) U.S. Cl. ..................... 415/191; 415/209.2
(58) Field of Search ............... 415/191, 209.2, 415/209.3, 231; 277/628, 630, 637, 641, 644, 647

(56) References Cited

U.S. PATENT DOCUMENTS

| | | | |
|---|---|---|---|
| 4,184,689 A | * 1/1980 | Brodell et al. ............ | 415/134 |
| 4,645,217 A | 2/1987 | Honeycutt, Jr. et al. | |
| 4,863,343 A | 9/1989 | Smed | |
| 5,149,250 A | * 9/1992 | Plemmons et al. ...... | 415/209.3 |
| 5,372,476 A | * 12/1994 | Hemmelgarn et al. ...... | 415/135 |
| 5,474,306 A | 12/1995 | Bagepalli et al. | |
| 5,509,669 A | 4/1996 | Wolfe et al. | |
| 5,586,773 A | 12/1996 | Bagepalli et al. | |
| 5,657,998 A | 8/1997 | Dinc et al. | |
| 5,915,697 A | 6/1999 | Bagepalli et al. | |
| 5,934,687 A | 8/1999 | Bagepalli et al. | |
| 6,162,014 A | 12/2000 | Bagepalli et al. | |

* cited by examiner

Primary Examiner—Ninh H. Nguyen
(74) Attorney, Agent, or Firm—Nixon & Vanderhye

(57) ABSTRACT

In a gas turbine having a chordal hinge seal between an inner rail of each nozzle segment and an annular axially facing sealing surface of a nozzle support ring, a supplemental seal is disposed between the support ring and inner rail of the nozzle segment on a high pressure side of the chordal hinge seal. The supplemental seal includes a pair of sheet metal shims overlaid by a woven metallic cloth. A bracket and a portion of the supplemental seal are received in a groove along a radial inward facing surface of the inner rail. The projecting margin of the cloth seal bears against the annular sealing surface of the nozzle support ring. The shims of the distal margin of the supplemental seal are slit and staggered in a chord-wise direction relative to one another to provide flexibility and effective sealing engagement with the nozzle support ring.

18 Claims, 10 Drawing Sheets

SUPPLEMENTAL SEAL FOR THE CHORDAL HINGE SEAL IN A GAS TURBINE

BACKGROUND OF THE INVENTION

The present invention relates to seals in a gas turbine for supplementing the chordal hinge seals between turbine nozzle segments and a turbine nozzle support ring and particularly relates to supplementary seals for substantially minimizing or eliminating leakage losses past the chordal hinge seals.

In a gas turbine, hot gases of combustion flow from combustors through first-stage nozzles and buckets and through the nozzles and buckets of follow-on turbine stages. The first-stage nozzles typically include an annular array or assemblage of cast nozzle segments each containing one or more nozzle stator vanes per segment. Each first-stage nozzle segment also includes inner and outer band portions spaced radially from one another. Upon assembly of the nozzle segments, the stator vanes are circumferentially spaced from one another to form an annular array thereof between annular inner and outer bands. A nozzle retaining ring coupled to the outer band of the first-stage nozzles supports the first-stage nozzles in the gas flow path of the turbine. An annular nozzle support ring, preferably split at a horizontal midline, is engaged by the inner band and supports the first-stage nozzles against axial movement.

In an exemplary arrangement, eighteen cast segments are provided with two vanes per segment. The annular array of segments are sealed one to the other along adjoining circumferential edges by side seals. The side seals seal between a high pressure region radially inwardly of the inner band, i.e., compressor discharge air at high pressure, and the hot gases of combustion in the hot gas flow path which are at a lower pressure.

Chordal hinge seals are used to seal between the inner band of the first-stage nozzles and an axially facing surface of the nozzle support ring. Each chordal hinge seal includes an axial projection which extends linearly along a chordline of the inner band portion of each nozzle segment. Particularly, the chordal hinge seal extends along an inner rail of each segment and which rail extends radially inwardly of the inner band portion. The chordal hinge seal projection lies in sealing engagement with the axially opposite facing sealing surface of the nozzle support ring.

During operation and/or repair of the first-stage nozzle, it has been found that warpage can leave gaps between the chordal hinge seals and the sealing surface of the nozzle support ring. These gaps enable leakage flow past the chordal hinge seals from the high pressure area radially within the annular inner band into the hot gas flow path. That is, the chordal hinge seals are inadequate to prevent leakage flow as the chordal hinge seal projections lose contact with the sealing surface of the nozzle support ring. Consequently, there is a need for a supplemental seal at the interface of the first-stage nozzles and nozzle support ring to minimize or eliminate the leakage flow past the chordal hinge seals.

BRIEF DESCRIPTION OF THE INVENTION

In accordance with a preferred embodiment of the present invention, there is provided a supplemental seal between the first-stage nozzles and the nozzle support ring which eliminates or minimizes leakage past the chordal hinge seals and which is readily and easily installed. In a preferred embodiment, the supplemental seal includes at least one and preferably two back-to-back sheet metal plates or shims wrapped in a woven metallic cloth attached to the inner rail of each nozzle segment. The supplemental seal extends from a groove formed in the radial inward facing surface of the inner rail to a distal margin which engages against a first surface of the nozzle support ring at a location radially inwardly of the chordal hinge seal. The distal margin is preloaded and it, together with the high pressure compressor discharge air in the high pressure region of the turbine, biases the cloth seal against the annular surface of the nozzle support ring.

Particularly, the proximal margins of the cloth seal and shims are secured, together with a support bracket, within a groove formed along the radial inward facing surface of the inner rail. Each seal segment extends linearly in a chord-wise direction relative to the turbine axis and is provided in lengths corresponding to the circumferential extent of each inner rail.

A mid-body portion of each seal projects generally axially along the radial inward facing surface of the inner rail toward the nozzle support ring. A distal margin turns in a generally radially inward direction to form a flexible distal leg or margin in sealing engagement with the sealing surface of the nozzle support ring. The shims in the leg of the distal margin of each seal are slit back from their distal edge to form a plurality of fingers. The fingers of one shim leg overlie the slits between the fingers of the other shim leg. That is, the slits of the shims are staggered in a chord-wise direction relative to one another such that the slits of each shim leg are effectively sealed by the fingers of the opposing shim leg. The slits afford flexibility to the sealing surface of the supplemental seal leg.

In a preferred embodiment according to the present invention, there is provided a turbine comprising a turbine nozzle support ring having a generally axially facing first surface, a turbine nozzle segment having at least one stator vane and a radially inwardly extending inner rail having a second surface in axial opposition to the first surface, a seal extending from a radial inward facing surface of the inner rail for sealing engagement against the first surface to form a seal therewith, the seal including a seal segment having at least a first plate, an overlay of a woven metallic cloth and a distal margin covered by the cloth and sealingly engaging the first surface and a bracket extending along the inner rail and at least a portion of one side of the seal segment to support the seal segment from the inner rail, the margin of the seal segment being flexible and preloaded to seal against the first surface.

In a further preferred embodiment according to the present invention, there is provided a turbine comprising a turbine nozzle support ring having a generally axially facing first surface, a plurality of turbine nozzle segments each having at least one stator vane and a radially inwardly extending inner rail having a second surface in axial opposition to the first surface, a seal comprised of a plurality of seal segments each extending from a radial inward facing surface of the inner rail for sealing engagement against the first surface to form a seal therewith, each seal segment including a first plate, an overlay of a woven metallic cloth and a distal margin covered by the cloth and engaging the first surface and a plurality of brackets extending along the inner rail and one side of the seal segments to support the seal segments from the inner rail, the margins of the seal segments being flexible and preloaded to seal against the first surface.

DETAILED DESCRIPTION OF THE INVENTION

Figure 1:
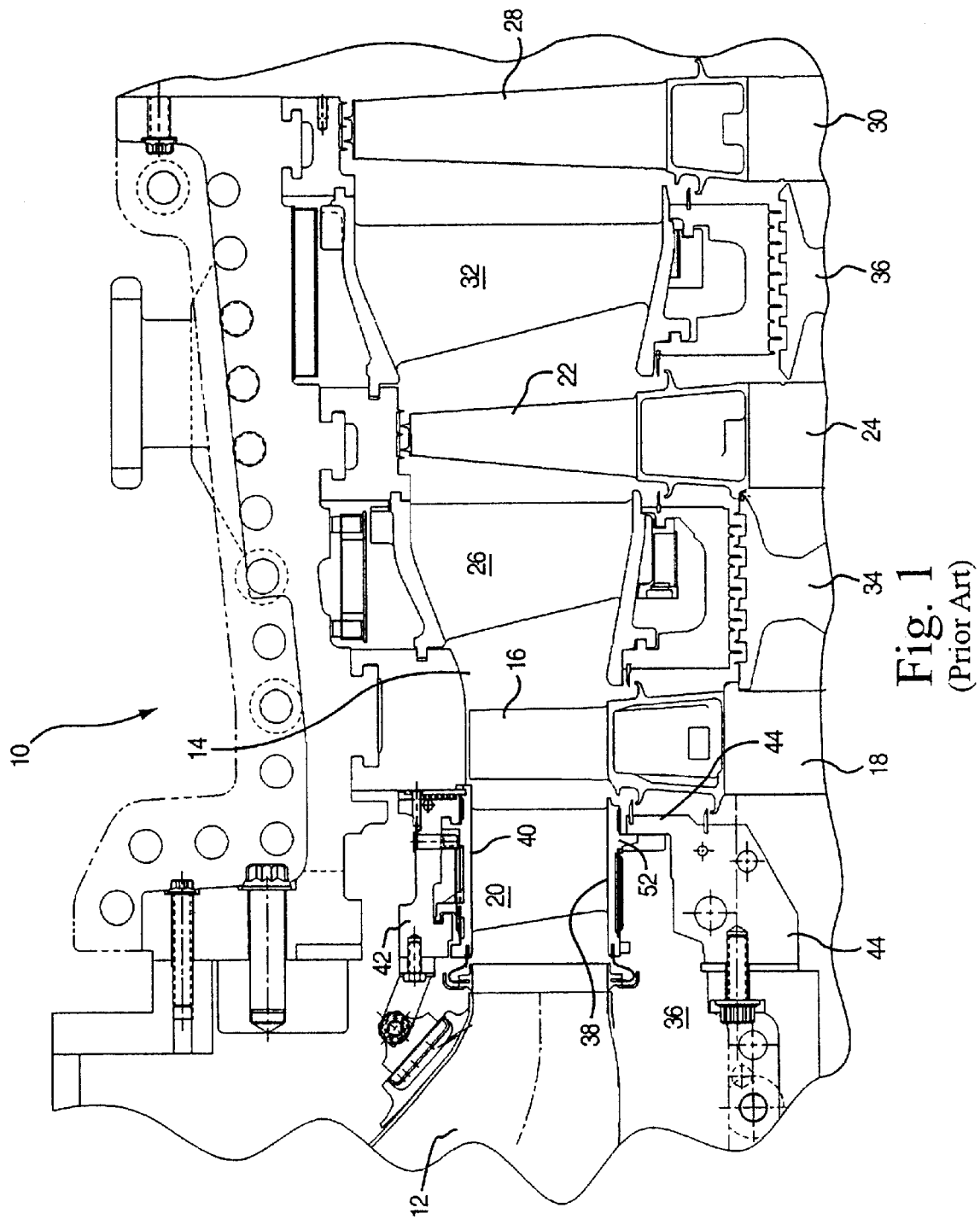
FIG. 1 is a fragmentary schematic side elevational view of a portion of a gas turbine.

Referring now to FIG. 1, there is illustrated a representative example of a turbine section of a gas turbine, generally designated 10. Turbine 10 receives hot gases of combustion from an annular array of combustors, not shown, which transmit the hot gases through a transition piece 12 for flow along an annular hot gas path 14. Turbine stages are disposed along the hot gas path 14. Each stage comprises a plurality of circumferentially spaced buckets mounted on and forming part of the turbine rotor and a plurality of circumferentially spaces stator vanes forming an annular array of nozzles. For example, the first stage includes a plurality of circumferentially-spaced buckets 16 mounted on a first-stage rotor wheel 18 and a plurality of circumferentially-spaced stator vanes 20. Similarly, the second stage includes a plurality of buckets 22 mounted on a rotor wheel 24 and a plurality of circumferentially-spaced stator vanes 26. Additional stages may be provided, for example, a third stage comprised of a plurality of circumferentially-spaced buckets 28 mounted on a third-stage rotor wheel 30 and a plurality of circumferentially-spaced stator vanes 32. It will be appreciated that the stator vanes 20, 26 and 32 are mounted on and fixed to a turbine casing, while the buckets 16, 22 and 28 and wheels 18, 24 and 30 form part of the turbine rotor. Between the rotor wheels are spacers 34 and 36 which also form part of the turbine rotor. It will be appreciated that compressor discharge air is located in a region 37 disposed radially inwardly of the first stage and that such air in region 37 is at a higher pressure than the pressure of the hot gases flowing along the hot gas path 14.

Figure 2:
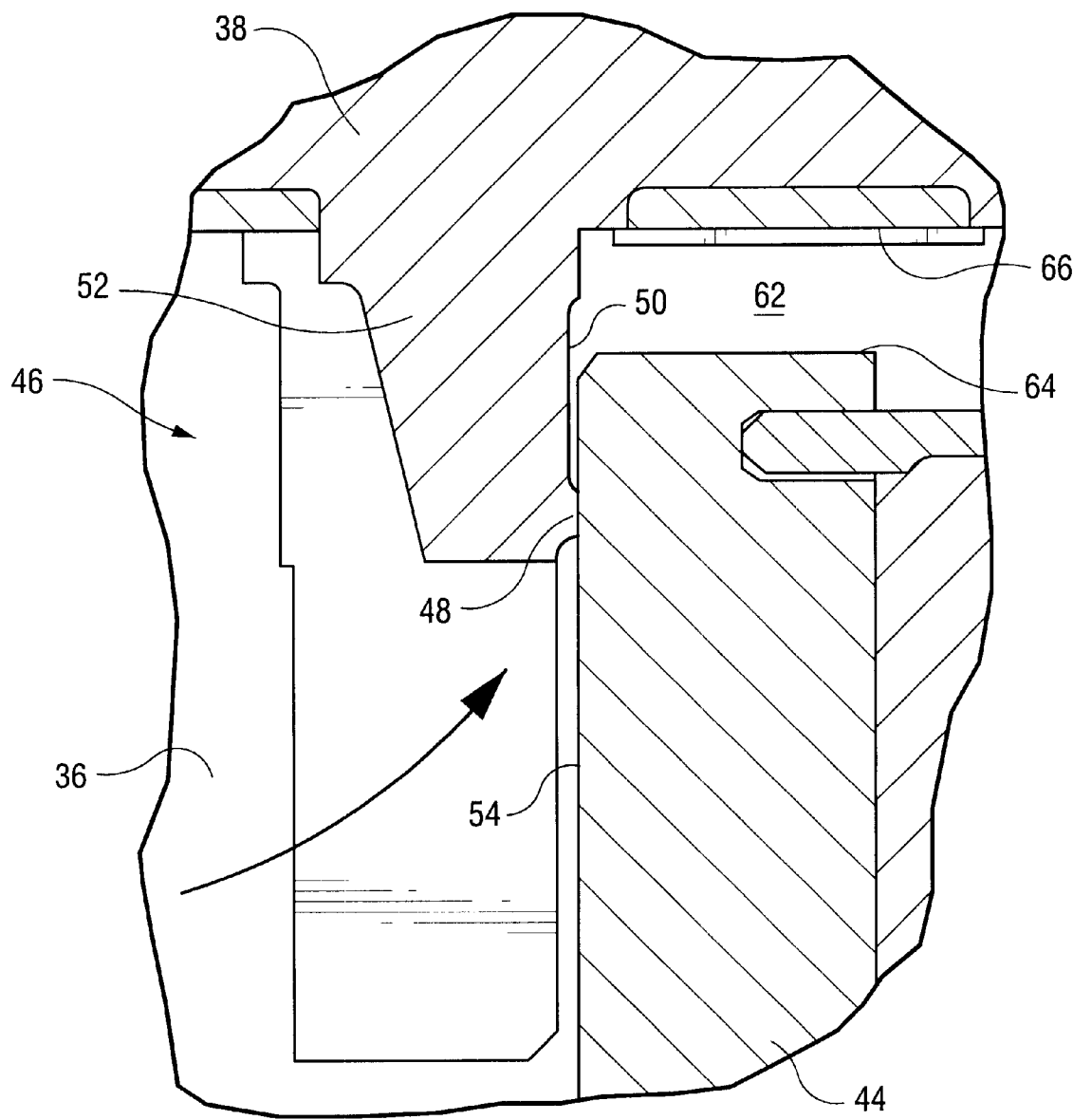
FIG. 2 is an enlarged fragmentary cross-sectional view illustrating a conventional chordal seal hinge.
Figure 3:
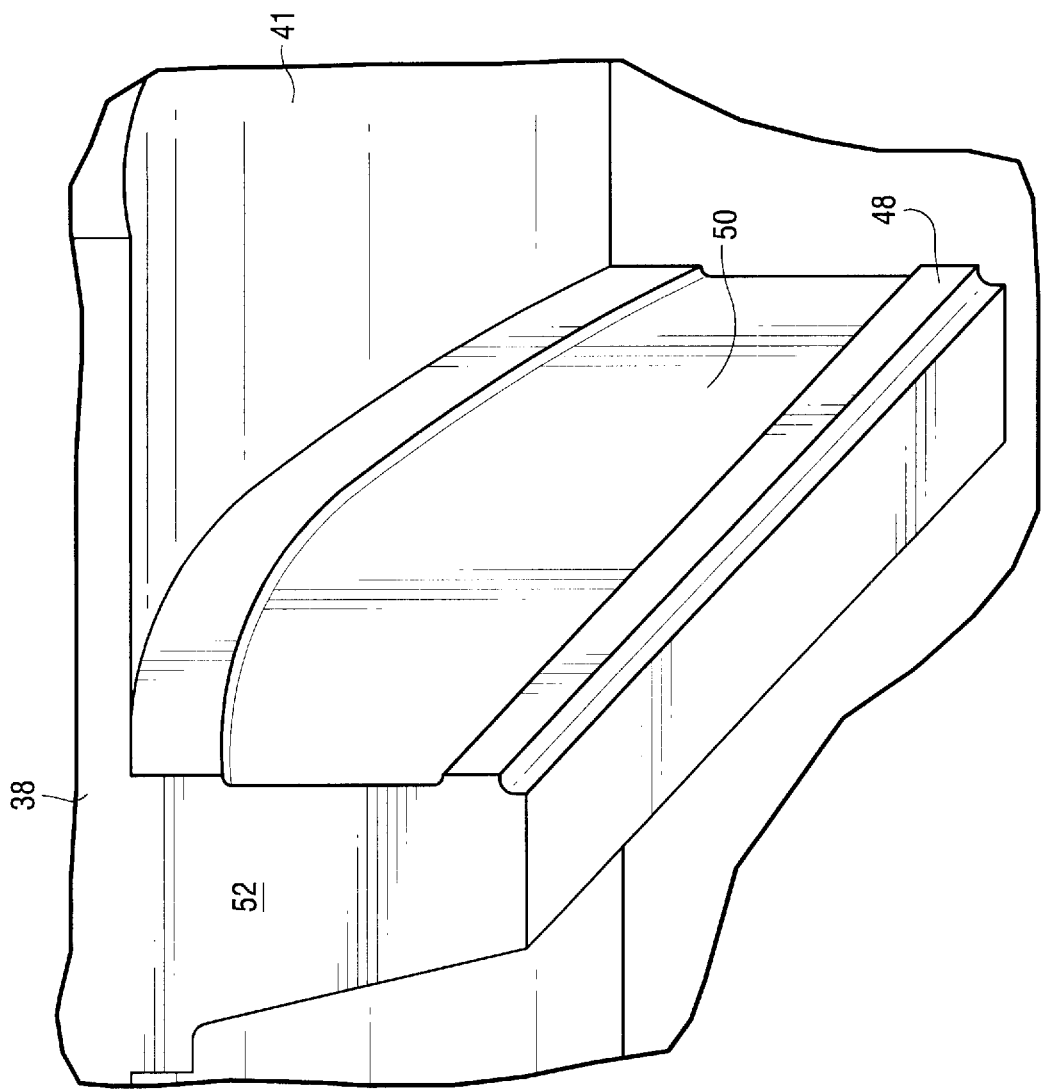
FIG. 3 is a fragmentary perspective view illustrating a portion of a conventional chordal hinge seal along an inner rail of a nozzle segment.
Figure 4:
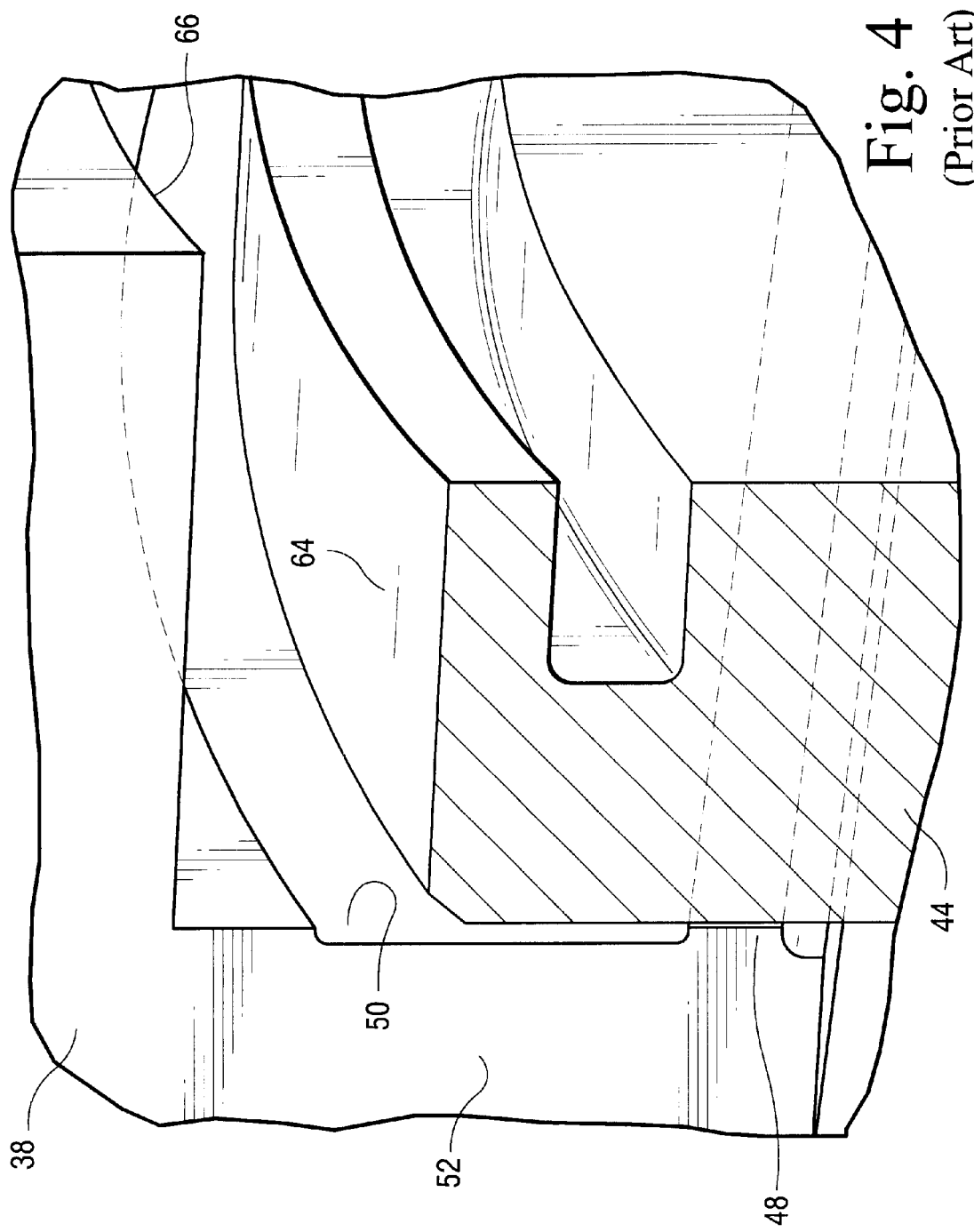
FIG. 4 is a fragmentary perspective view with parts in cross-section illustrating the conventional chordal hinge seal in sealing engagement with a nozzle support ring of the gas turbine.

Referring to the first stage of the turbine, the stator vanes 20 forming the first-stage nozzles are disposed between inner and outer bands 38 and 40, respectively, supported from the turbine casing. As noted above, the nozzles of the first stage are formed of a plurality of nozzle segments 41 (FIG. 3) each mounting one, preferably two, stator vanes extending between inner and outer band portions and arranged in an annular array of segments. A nozzle retaining ring 42 connected to the turbine casing is coupled to the outer band and secures the first-stage nozzle. A nozzle support ring 44 radially inwardly of the inner band 38 of the first-stage nozzles engages the inner band 38. Particularly, the interface between the inner band 38 and the nozzle support ring 44 includes an inner rail 52 (FIG. 2). The inner rail 52 includes a chord-wise, linearly extending axial projection 48, generally and collectively hereinafter referred to as a chordal hinge seal 46. Projection 48 extends along an axial facing surface 50 of the inner rail 52 which forms an integral part of each nozzle segment and specifically the inner band 38. The projection 48 engages a first annular surface 54 of the nozzle support ring 44. It will be appreciated that high pressure compressor discharge air lies in the region 37 and lower pressure hot gases flowing in the hot gas path 14 lie on the opposite side of the seal 48. The chordal hinge seal 46 is thus intended to seal against leakage from the high pressure region 37 into the lower pressure region of the hot gas path 14.

As noted previously, however, when operating the turbine, component parts of the nozzles and nozzle support ring will tend to form leakage gaps between the projections 48 and the surface 54 of the nozzle support ring 44 whereby leakage flow may occur from the high pressure region to the low pressure region. In order to minimize or prevent leakage flow into the hot gas path 14, and in accordance with a preferred embodiment of the present invention, there is provided a supplemental seal for sealing between the first-stage nozzles and the nozzle support ring 44. The supplemental seal, generally designated 70 (FIG. 5), is provided in seal segments 73. Each segment 73 includes a chord-wise linearly extending cloth seal formed by back-to-back sheet metal shims wrapped in preferably a woven metallic cloth and secured to a first-stage nozzle segment. Particularly, the supplemental seal 70 includes one, and preferably a pair of sheet metal plates or shims 72 and 74 overlaid on both sides by a woven metallic cloth 76. Seal 70 also includes a bracket 80 which extends chord-wise and linearly along one side of a proximal margin 77 of the seal and provides a rigid support for the seal. The metallic cloth and shims of margin 77 are integrally secured to the bracket 80 along the interfaces of the bracket 80 and cloth 76, for example, by welding.

To support the supplemental seals 70 from the nozzle segments, particularly from the inner rails 52, each seal segment 73 is shaped to provide a proximal margin 77, a central body portion 82 and a distal margin 84. Additionally, a groove 86 is formed in the inner rail 52 and extends linearly in a chord-wise direction opening through a radial inward face 88 of the inner rail. The groove 86 also has an offset recess 90 which receives a flange 92 formed on the bracket 80. With the proximal margin 77 of each cloth seal 70 welded to the bracket 80, the bracket and seal may be displaced linearly in a chord-wise direction for reception in the groove 86. Suitable welds may be provided to secure the seal to the inner rail 52.

Figure 5:
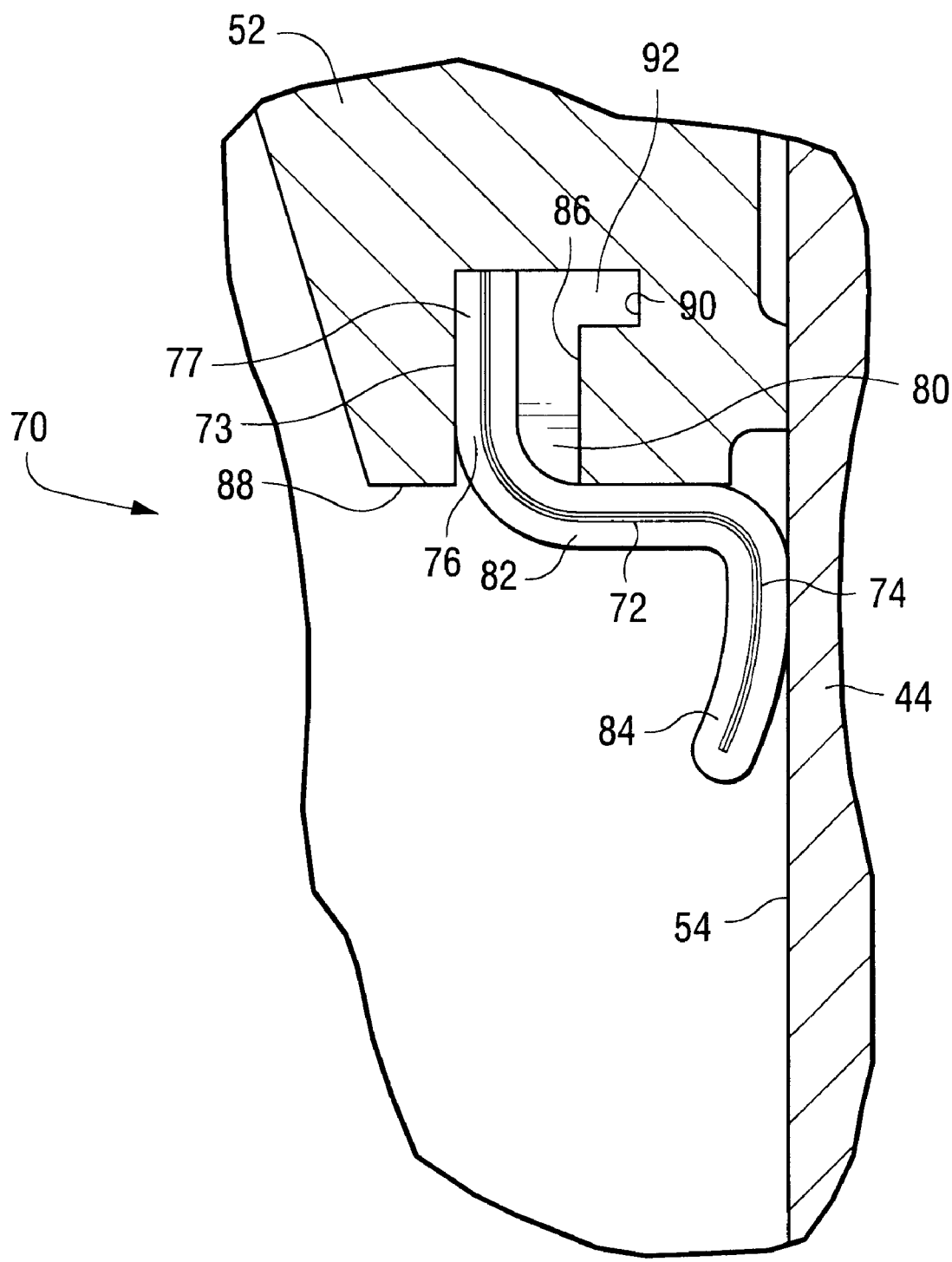
FIG. 5 is a fragmentary side elevational view of a supplemental seal installed in conjunction with a chordal hinge seal.
Figure 6:
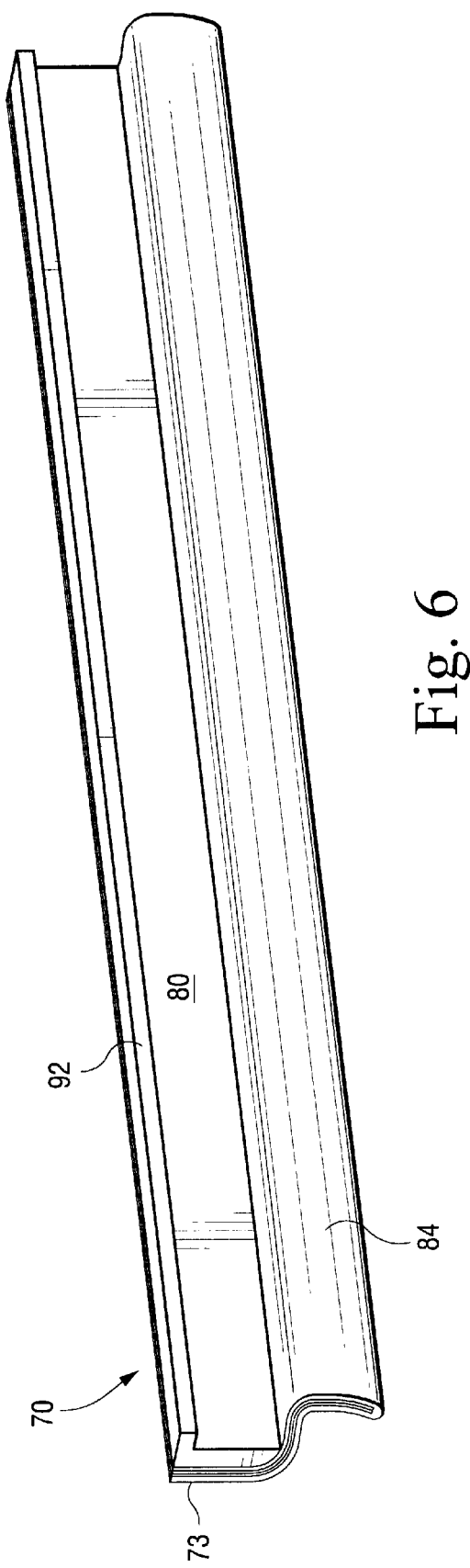
FIG. 6 is an enlarged perspective view illustrating a supplemental seal according to a preferred embodiment of the present invention.

As illustrated in FIG. 5, the central body portion 82 of each seal segment 73 is bent or folded from the proximal margin 77 to extend in a generally axial direction toward the nozzle support ring 44 and in direct underlying relation to the inner radial face 88 of the inner rail 52. The seal segment 73 then turns generally radially inwardly to form the distal margin 84. The margin 84 engages and bears against the sealing surface 54 of the nozzle support ring 44 to seal against surface 54. The woven metallic cloth of the distal margin 84 bears against the sealing surface 54. It will be appreciated that the shims or plates 72 and 74 are preloaded to maintain the margin 84 in sealing engagement against surface 54. Also, in use, the high pressure region 37 of the turbine biases the flexible margin 84 into engagement with the surface 54.

Figure 7:
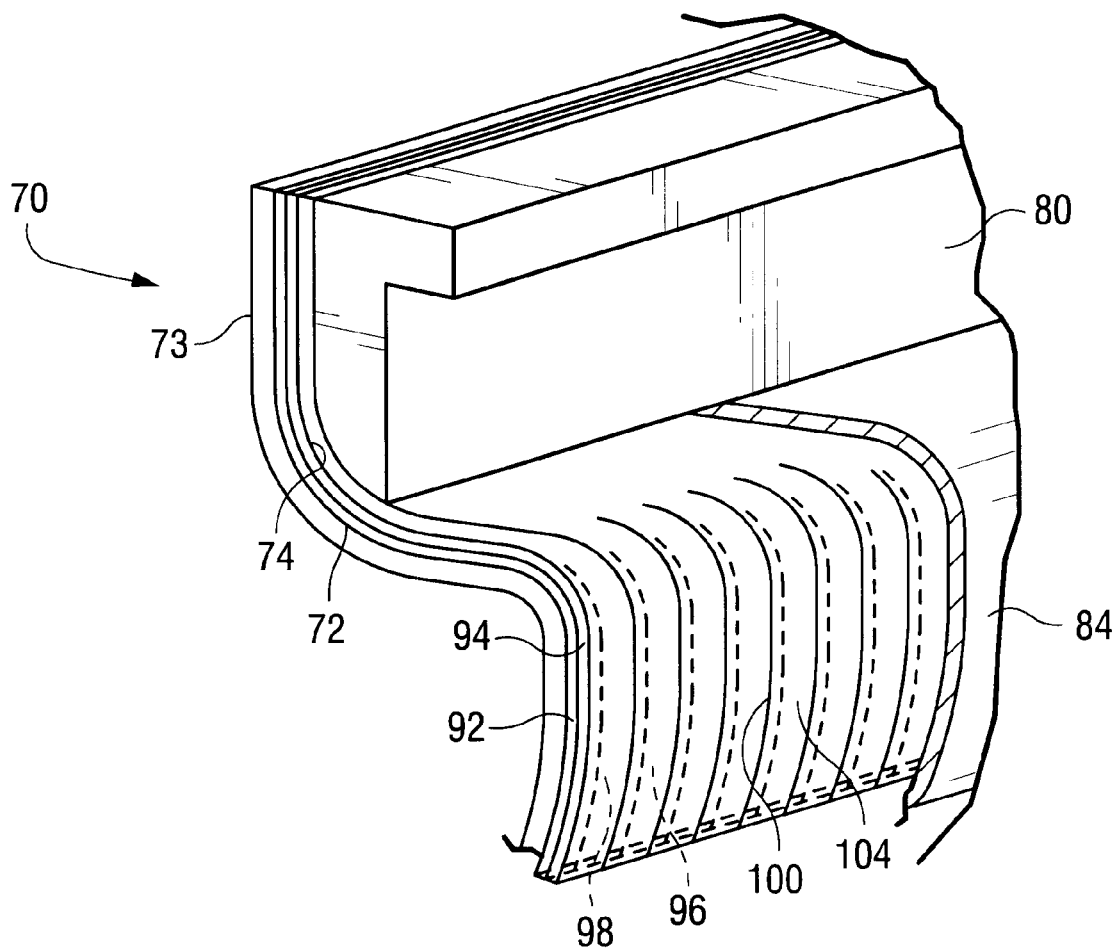
FIG. 7 is a fragmentary perspective view of the seal with portions broken out to illustrate the fingers of the shims.
Figure 8:
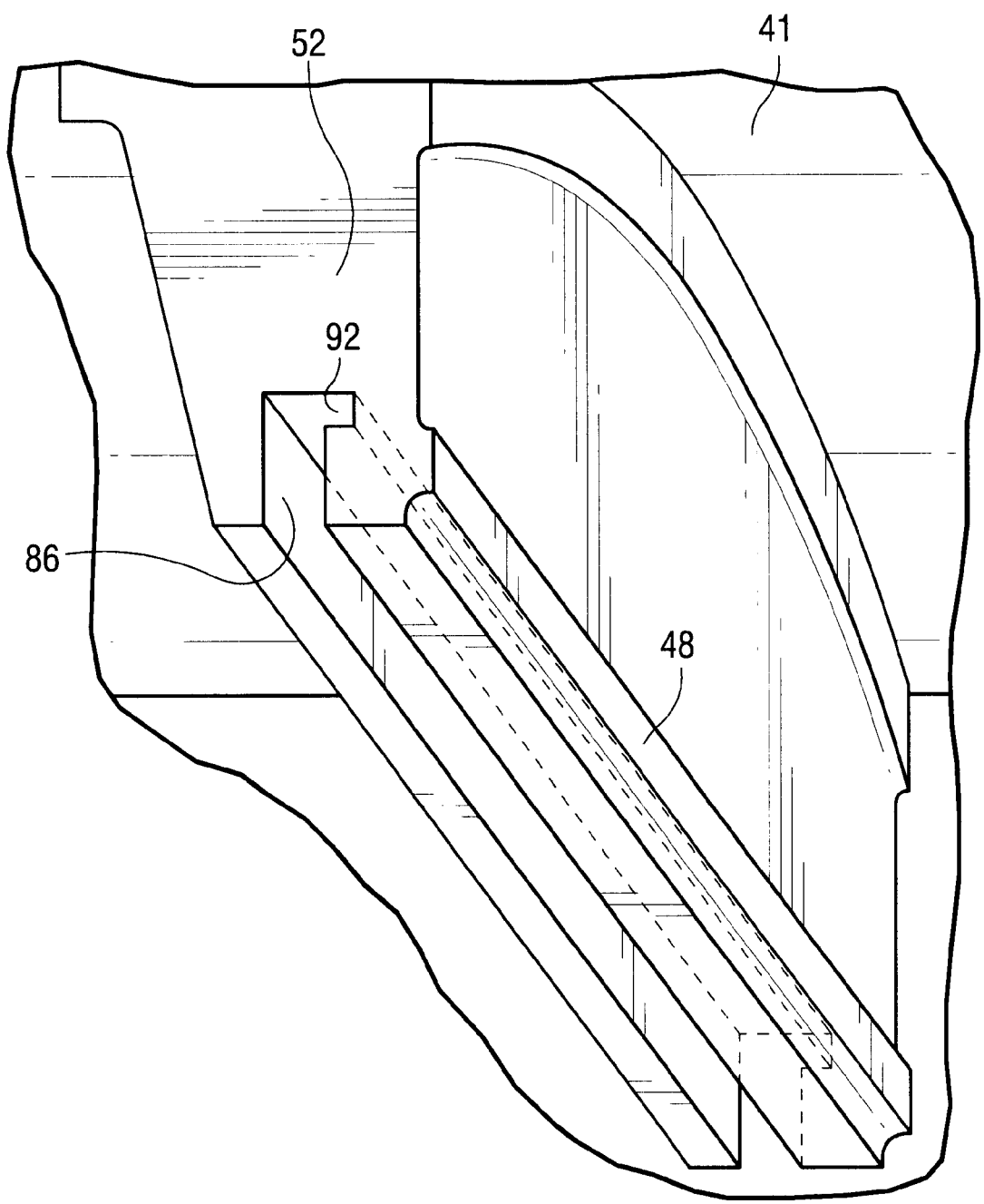
FIG. 8 is a view similar to FIG. 3 illustrating a groove in the inner rail for receiving the supplemental seal.

As best illustrated in FIG. 7, the portions of the shims 72 and 74 forming the distal margin 84 are slit at laterally spaced locations along the seal 70 to form fingers 92 and 94, respectively. For example, the shim 72 is slit at 96 at chord-wise spaced locations therealong to form discrete fingers 98. The shim 74 is likewise slit at 100 at chord-wise spaced locations therealong to form discrete fingers 104. The slits 96 and 100 are staggered in a chord-wise direction relative to one another such that the fingers 104 formed by the slits 100 overlie the slits 96 between the fingers 98 of shim 72. Thus, the fingers 98 and 104 alternate along the length of the distal margin 84 of the seal segment 73. The fingers render the distal margin flexible, thereby affording an effective seal with the sealing surface 54. The overlapping of the slits by the fingers also affords a sealing action inhibiting flow between the slits.

Figure 10:
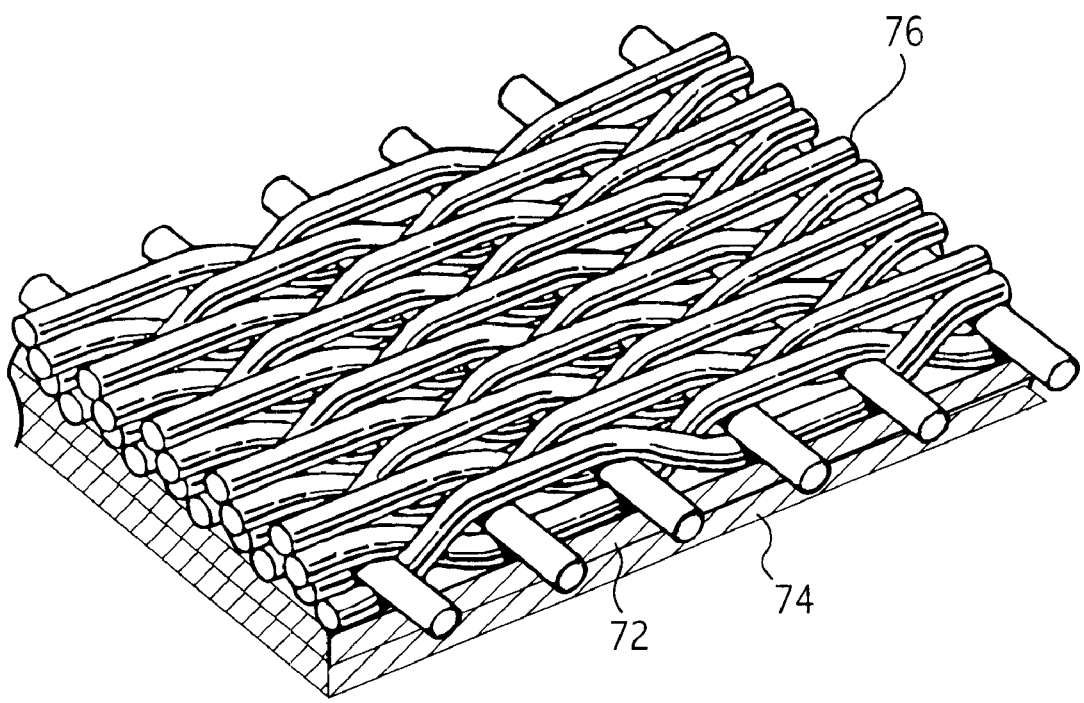
FIG. 10 is a perspective view of a metallic cloth weave for the supplemental seal hereof.

In FIG. 10, there is illustrated a portion of a preferred metallic cloth overlaying a shim, for example, shim 72. The cloth overlays in the form of a Dutch twill weave, preferably formed of L605 or Hanes 188 material, and, with the relatively dense weave, forms an effective seal and wear surface.

Figure 9:
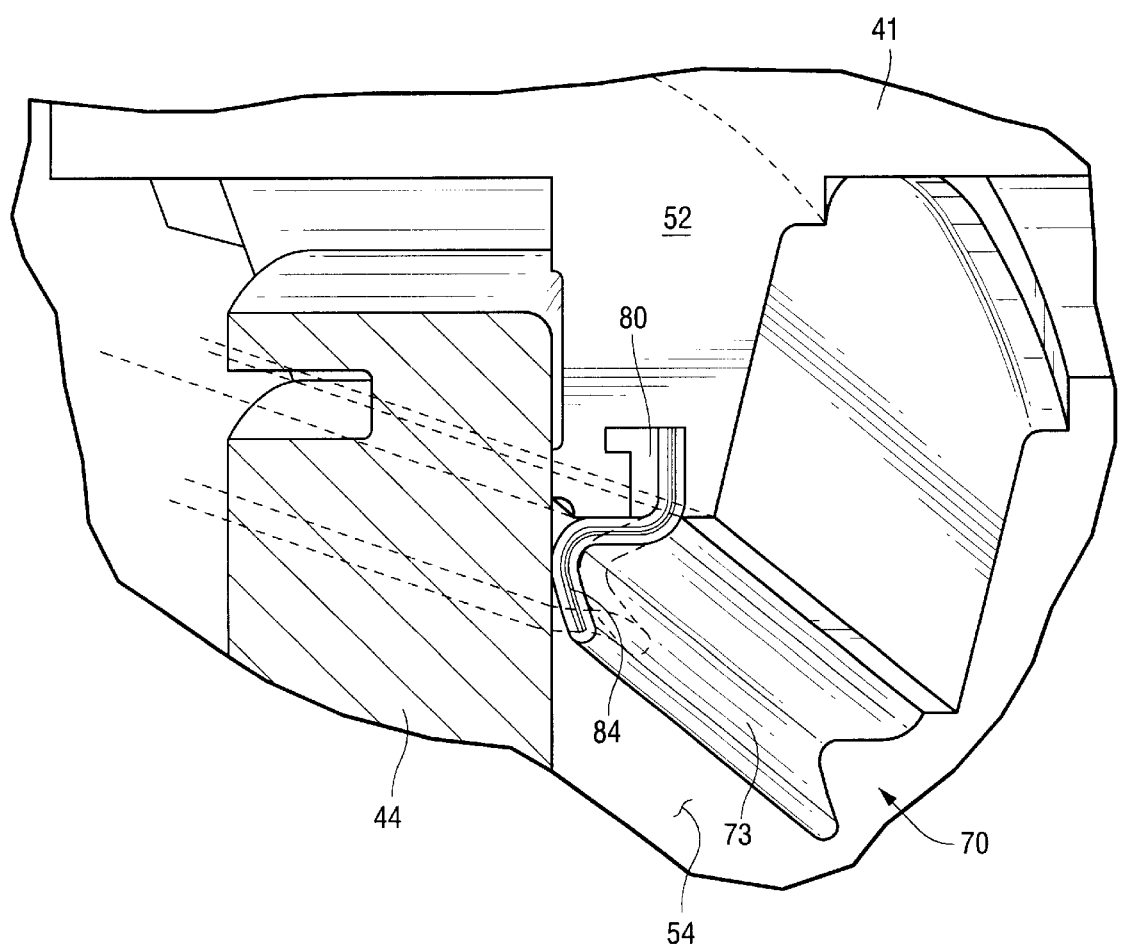
FIG. 9 is a perspective view of the supplemental seal with an adjacent supplemental seal with end overlap.

The supplemental seal segments are provided preferably in the same number as the number of nozzle segments. Consequently, the supplemental seal segments overlie the joints between the nozzle segments and butt endwise with one another, thereby to reduce nozzle intersegment leakage, as well as leakage past the chordal hinge seals. As illustrated in FIG. 9, the ends of the seal segment 73 may be overlapped relative to one another to effect enhanced sealing adjacent the gap between the nozzle segments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine comprising:

a turbine nozzle support ring having a generally axially facing first surface;

a turbine nozzle segment having at least one stator vane and a radially inwardly extending inner rail having a second surface in axial opposition to said first surface;

a seal extending from a radial inward facing surface of said inner rail for sealing engagement against said first surface to form a seal therewith;

said seal including a seal segment having at least a first plate, an overlay of a woven metallic cloth and a distal margin covered by said cloth and sealingly engaging said first surface; and a bracket extending along said inner rail and at least a portion of one side of said seal segment to support said seal segment from said inner rail, said margin of said seal segment being flexible and preloaded to seal against said first surface.

2. A turbine according to claim 1 wherein said seal segment includes a second plate, said plates lying back-to-back with one another, said cloth extending as an overlay along opposite sides of said first and second plates.

3. A turbine according to claim 2 wherein said seal extends linearly in a chord-wise direction along said inner rail, said plates having slits extending from edges thereof and along said margin to provide flexibility to said seal.

4. A turbine according to claim 3 wherein the slits along a margin of said first plate and the slits along a margin of said second plate are staggered relative to one another in a chordal direction about the rotor axis.

5. A turbine according to claim 1 wherein said inner rail has a projection extend axially from said inner rail for sealing engagement against said first surface and forming a second seal therewith.

6. A turbine according to claim 5 wherein said projection extends linearly along said inner rail.

7. A turbine according to claim 6 wherein said sealing engagement between said projection and said first surface lies on a low pressure side of the first-mentioned seal.

8. A turbine according to claim 7 wherein the first seal extends linearly in a chord-wise direction about the axis of the turbine.

9. A turbine according to claim 1 wherein said inner rail has a groove extending in a chord-wise direction and opening through said inward facing surface thereof, said bracket and said one side seal portion lying in said groove.

10. A turbine according to claim 9 wherein said bracket includes a flange and said groove has a recess complementary to said flange, said bracket and said one side seal portion extending in a chord-wise direction.

11. A turbine according to claim 9 wherein said inner rail has a projection extending axially from said inner rail for sealing engagement against said first surface and forming a second seal therewith.

12. A turbine comprising:

a turbine nozzle support ring having a generally axially facing first surface;

a plurality of turbine nozzle segments each having at least one stator vane and a radially inwardly extending inner rail having a second surface in axial opposition to said first surface;

a seal comprised of a plurality of seal segments each extending from a radial inward facing surface of said inner rail for sealing engagement against said first surface to form a seal therewith;

each said seal segment including a first plate, an overlay of a woven metallic cloth and a distal margin covered by said cloth and engaging said first surface; and a plurality of brackets extending along said inner rail and one side of said seal segments to support said seal segments from said inner rail, said margins of said seal segments being flexible and preloaded to seal against said first surface.

13. A turbine according to claim 12 wherein each said seal segment includes a second plate, said first and second plates of each said seal segment lying back-to-back with one another, said cloth extending as an overlay along opposite sides of said first and second plates.

14. A turbine according to claim 12 wherein each of said seal segments extends in a chord-wise direction and has a chord-wise extent corresponding to the chord-wise extent of each inner rail.

15. A turbine according to claim 12 wherein each said seal segment includes a second plate, said first and second plates of each said seal body lying back-to-back with one another, said cloth extending as an overlay along opposite sides of said first and second plates, said plates having slits extending from edges thereof and along said margin to provide flexibility to said seal.

16. A turbine according to claim 15 wherein the slits along a margin of said first plate and the slits along a margin of said second plate in each seal segment are staggered relative to one another in a chord-wise direction along the inner rail.

17. A turbine according to claim 12 wherein each said inner rail has a projection extending axially therefrom for sealing engagement against said first surface and forming a second seal therewith.

18. A turbine according to claim 17 wherein said projections extend linearly along said inner rails.

* * * * *

UNITED STATES PATENT AND TRADEMARK OFFICE
CERTIFICATE OF CORRECTION

PATENT NO. : 6,609,885 B2
DATED : August 26, 2003
INVENTOR(S) : Mohammed-Fakir et al.

It is certified that error appears in the above-identified patent and that said Letters Patent is hereby corrected as shown below:

Column 3,
Line 38, kindly delete "spaces" and insert -- spaced -- therefor.

Column 6,
Line 6, kindly delete "extend" and insert -- extending -- therefor.

Signed and Sealed this

Fourteenth Day of October, 2003

JAMES E. ROGAN
*Director of the United States Patent and Trademark Office*